J. B. Stoner.
Plow Clevis.
Nº 7,638.  Patented Sept. 10, 1850.
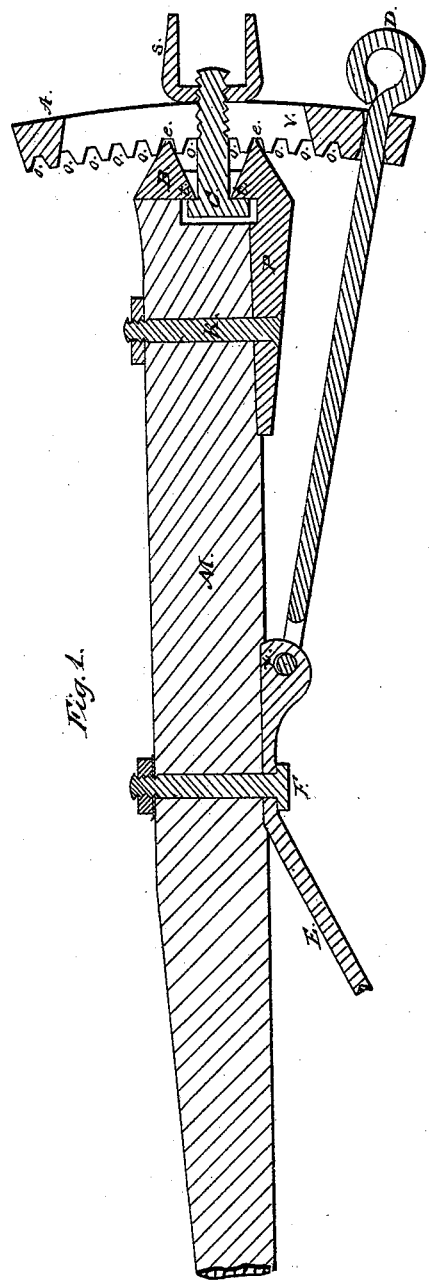
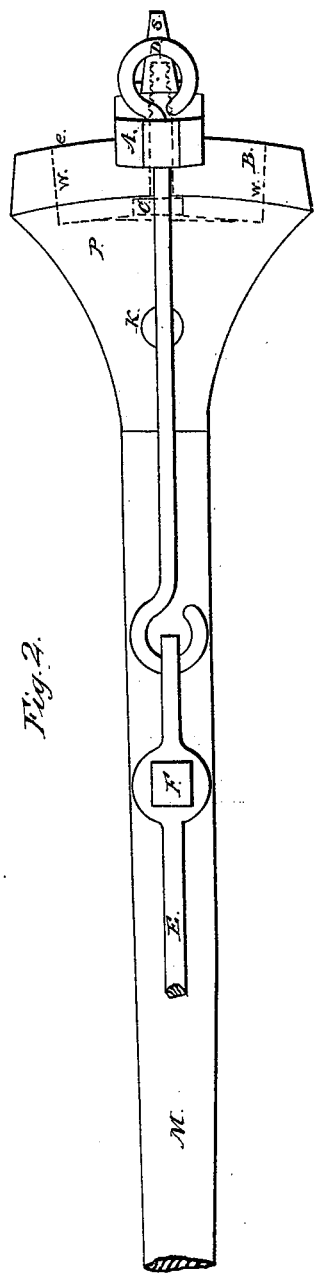

UNITED STATES PATENT OFFICE.

JNO. B. STONER, OF SOUTHAMPTON, PENNSYLVANIA.

IMPROVEMENT IN PLOW-CLEVISES.

Specification forming part of Letters Patent No. 7,638, dated September 10, 1850.

*To all whom it may concern:*

Be it known that I, JOHN B. STONER, of Southampton township, Cumberland county, State of Pennsylvania, have invented a new and useful Center-Draft Clevis; and I do hereby declare that the following is a full, clear, and exact description thereof, reference being had to the accompanying drawings, of which—

Figure 1 is a vertical section, and Fig. 2 an under side plan, of the clevis, of the end of the plow-beam, and of the martingale leading to center of the plow, and in both of which figures corresponding letters mark the same parts.

The construction and use of this clevis are indicated in the drawings as follows:

M is the plow-beam to which the clevis is attached.

A is an arc of a circle, which I prefer to make of wrought-iron, and having notches o o o on the interior side.

B is an arc of circle having two edges, e e, Fig. 1, to fit the notches on the inner curve of A.

P is a plate or wing on the lower part of the arc B, by means of which it is attached to the under side of the beam, as seen in Fig. 2.

K is a bolt, of which one or more may be employed to connect the horizontal arc B to the beam M.

v is a slot in the arc A, Fig. 1, in which is the bolt for fastening, by a nut and screw, the arc A in any required position. w w are dotted lines representing the limits of a similar slot in the arc B.

C is an adjusting screw-bolt, movable along the slot in the arc B, and held by its head against the interior edges, t t, of the inner curve of the arc.

S is the nut which holds the arc A in contact with the edges e e at any required position along the arc B.

D is a connecting or attaching link for draft, and this passes through a hole in the lower end of the arc A, passing back to connect with E.

E is the martingale, connected by a bolt or strap, F, to the beam, and thence descending at the part represented as broken off to the center of the plow.

o o o, &c., are notches or teeth on the inside curve of the arc A.

The operation of the clevis is to guide the plow, as required by the nature of the soil, either more or less toward the landside, or to greater or less depths, according to the position in which the arc A is fixed upon the arc B. By unscrewing the clamp-screw S the notches o o of the arc A release the edges e e of the arc B, and the arc A may be elevated or depressed, thereby raising or lowering the attachment D. For this change in vertical direction of the draft it is necessary to turn back S to the distance of the depth of the notches o o; but to give a variation of tendency in a horizontal direction without a change in the vertical, it is sufficient barely to release the strain on S, so as to allow the arc A to slide along the curved edges e e, and when brought into the required position to screw it fast again and proceed with the work. In whatever position the arc A is set upon the arc B the force of draft is transferred from the beam, which in ordinary practice is made to receive it, to the martingale or strap E, by which it is transmitted to the body of the plow.

The advantage of this clevis is that the fastening of the arcs A and B in the required position is effected in a direction radial to both the curves or arcs A and B. These curves are adjusted to the distance back of the point x, where the draft-link D connects with the martingale E. There is consequently no more tendency to derangement of the arcs in one horizontal direction than in the other. Another advantage is that the double bearings or arched edges e e, on which the notches o o, rest give a full support to the outer arc, A, when it is forced against them by the screw-nut S. A third advantage is that the head of the screw-bolt C, instead of depending on the wood of the plow-beam to hold it and sustain the strain put upon it, bears immediately upon the edges t t of the slot in the arc B, and consequently has an unyielding metallic support both under the head and the nut of the bolt. A fourth advantage is that by the use of this clevis and martingale the force of draft is taken from the timber of the beam and is transmitted through the martingale.

Instead of the second screw-bolt, c, a strap or stirrup which should admit a key-wedge to serve as a clamp, might be substituted, though I prefer the screw-clamp for its simplicity and ease of management.

Having thus described my invention, what I claim as new, and desire to secure by Letters Patent, is—

1. Forming a plow-clevis by means of two arcs of metal of corresponding outward curvatures, having the point of attachment of the draft-link to the martingale for their common center of curvature, in the manner and for the purposes herein set forth.

2. In combination with a fixed horizontal arc having a slot between bearing-edges, the vertical arc having notches on its inner curve adapted to the bearing-edges of the fixed arc, whereby the direction of draft may be varied horizontally or vertically, as required.

JOHN B. STONER.

Witnesses:
   WALTER R. JOHNSON,
   HIRAM CARVER.